United States Patent [19]

McGinnis

[11] 4,410,082
[45] Oct. 18, 1983

[54] STRETCHABLE LOAD-RETAINING CONVEYOR BELT

[75] Inventor: Hebert E. McGinnis, Akron, Ohio

[73] Assignee: The First National Bank of Akron, Akron, Ohio

[21] Appl. No.: 399,768

[22] Filed: Jul. 19, 1982

Related U.S. Application Data

[63] Continuation-in-part of Ser. No. 181,404, Aug. 26, 1980, abandoned.

[51] Int. Cl.³ .................... B65G 15/08; B65G 15/34
[52] U.S. Cl. ................................. 198/818; 198/821; 198/847; 198/819; 428/77; 428/113
[58] Field of Search ............ 198/337, 818, 819, 820, 198/821, 847; 428/77, 113

[56] References Cited

U.S. PATENT DOCUMENTS

| | | | |
|---|---|---|---|
| 885,955 | 4/1908 | Reddaway | 198/847 |
| 3,212,627 | 10/1965 | Beebee | 198/847 |
| 3,469,676 | 9/1969 | Wheeler | 198/821 |
| 3,615,152 | 10/1971 | Bouzat et al. | 198/818 X |
| 4,061,223 | 12/1977 | McGinnis | 198/821 |
| 4,106,613 | 8/1978 | Thomson | 198/847 |

FOREIGN PATENT DOCUMENTS

| | | | |
|---|---|---|---|
| 1934342 | 7/1970 | Fed. Rep. of Germany | 198/819 |
| 796295 | 4/1936 | France | 198/819 |

*Primary Examiner*—Jeffrey V. Nase
*Attorney, Agent, or Firm*—Frederick K. Lacher

[57] ABSTRACT

A conveyor belt of stretchable elastomeric material reinforced by layers of cords which permit an initial stretching of the belt at installation of at least 3 percent. Reinforcing cords are positioned in the belt elastomeric material to generate transverse forces during stretching of the belt which results in the interaction of the material of the belt with the cords. This interaction causes the edge portions of the belt to curl upwardly and form load-retaining walls at the edges. The belt may have a bottom stretchable portion which is reinforced to resist outside transverse forces resulting from the passage of the belt around a curve. A top stretchable portion of the belt has edge portions which bend upwardly to form the load-retaining walls. The edge portions of the belt may curl sufficiently to bring the edges together and they may be connected for enclosing the load on the belt surface.

22 Claims, 22 Drawing Figures

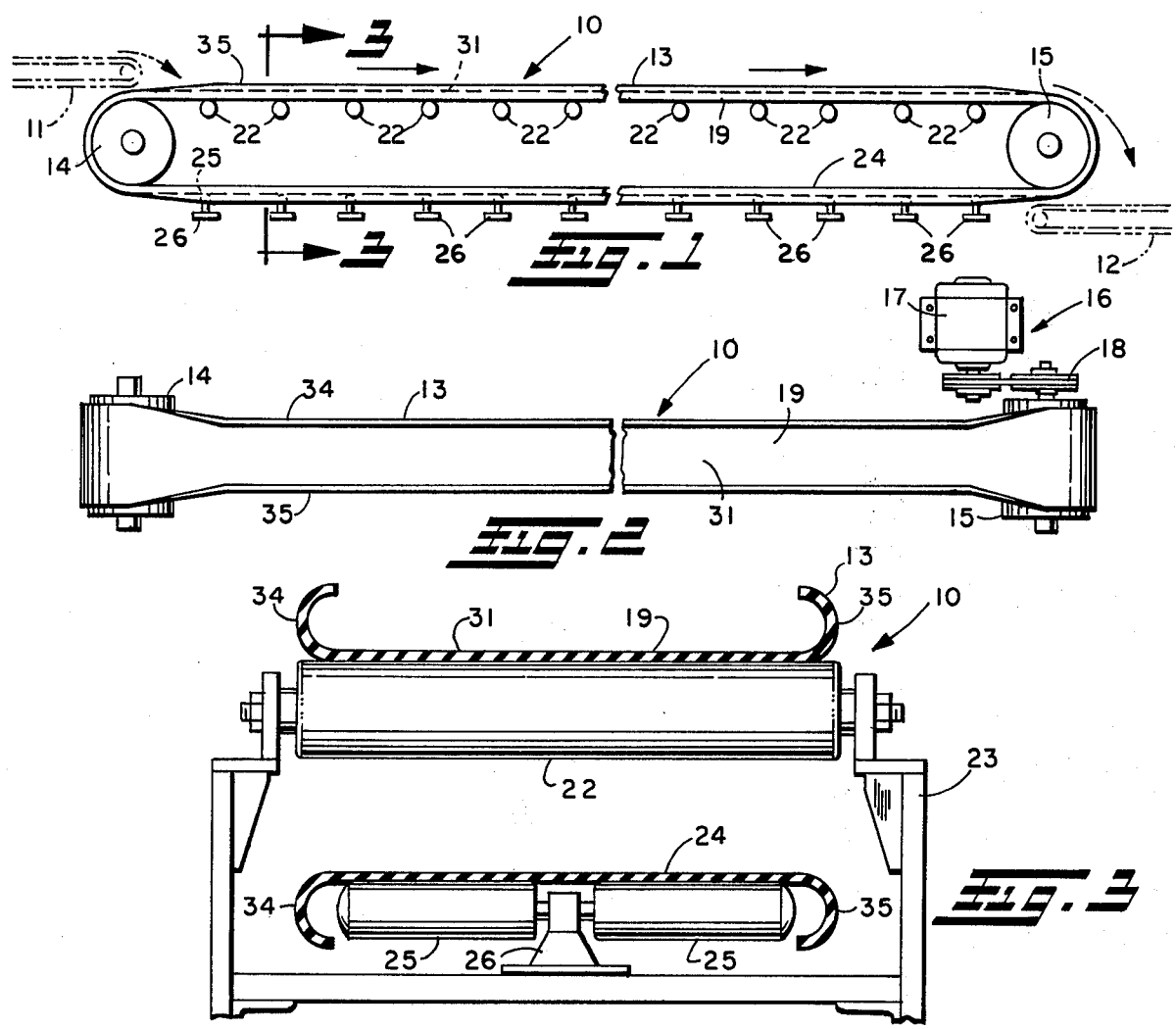

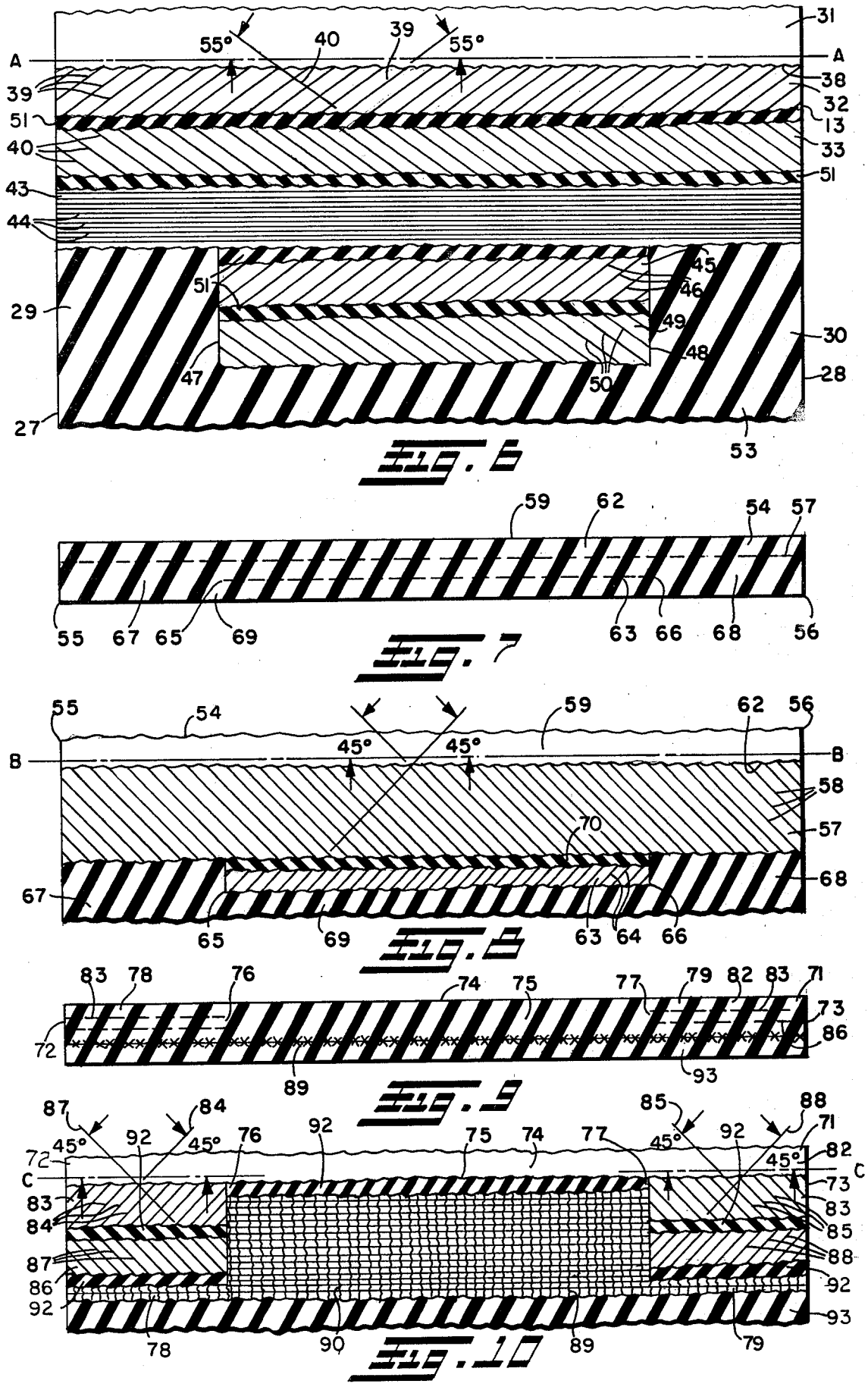

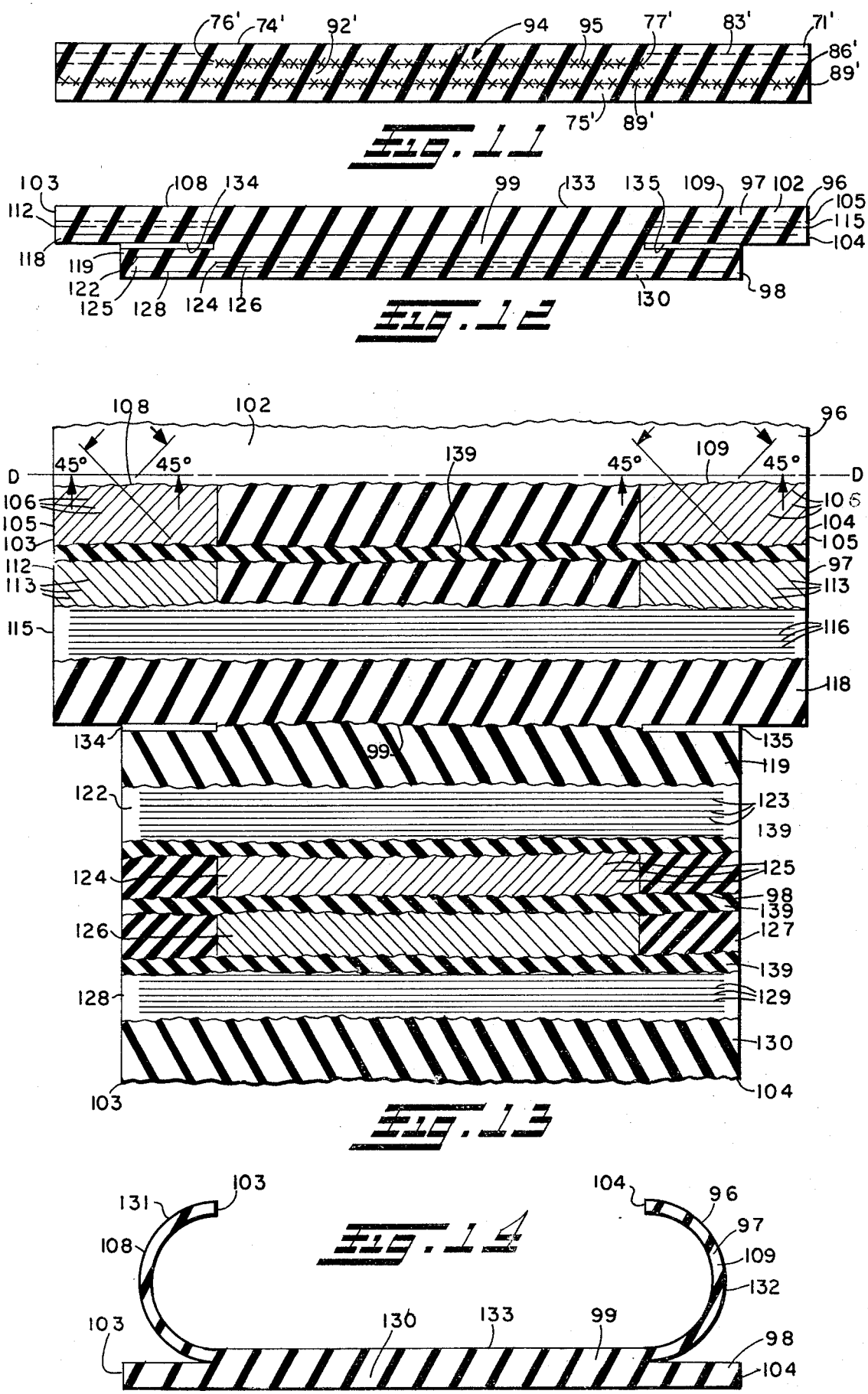

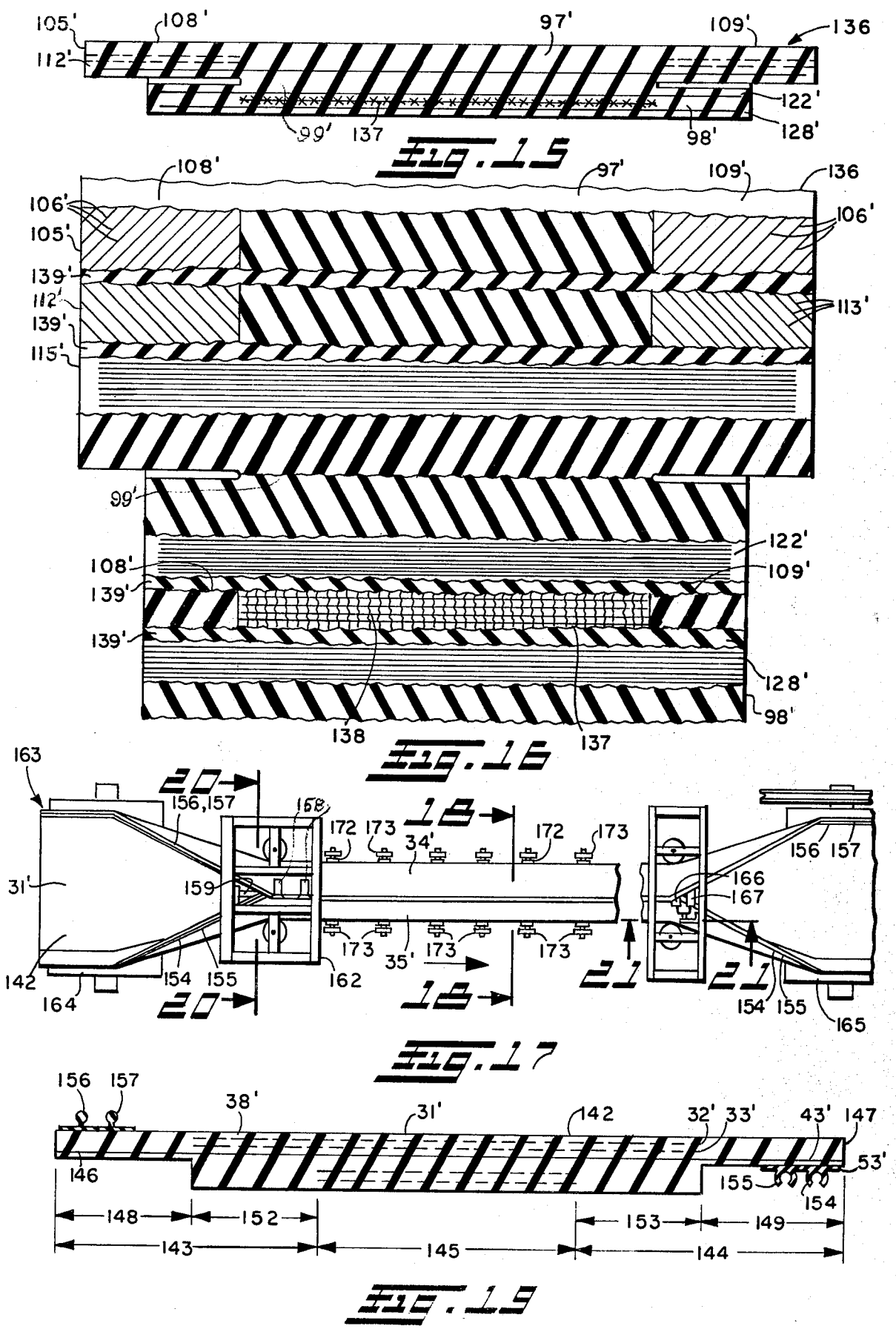

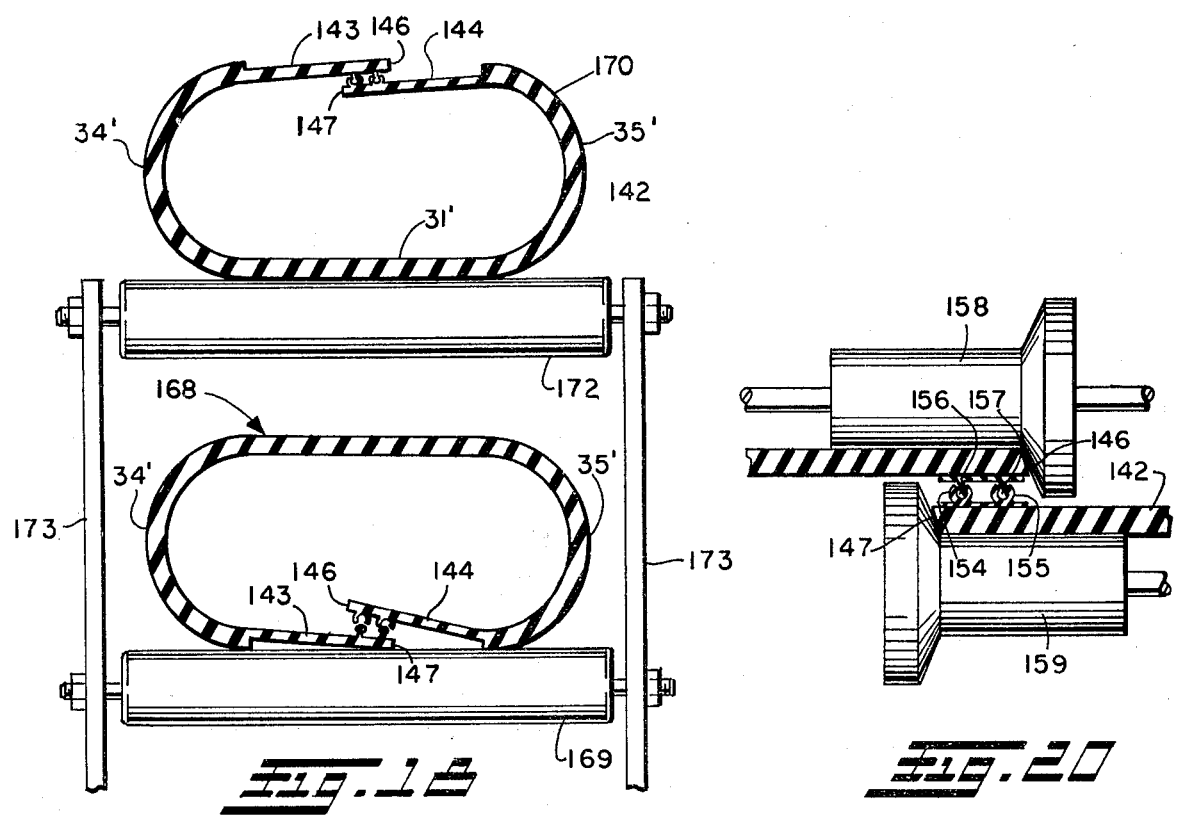
Fig. 19
Fig. 20
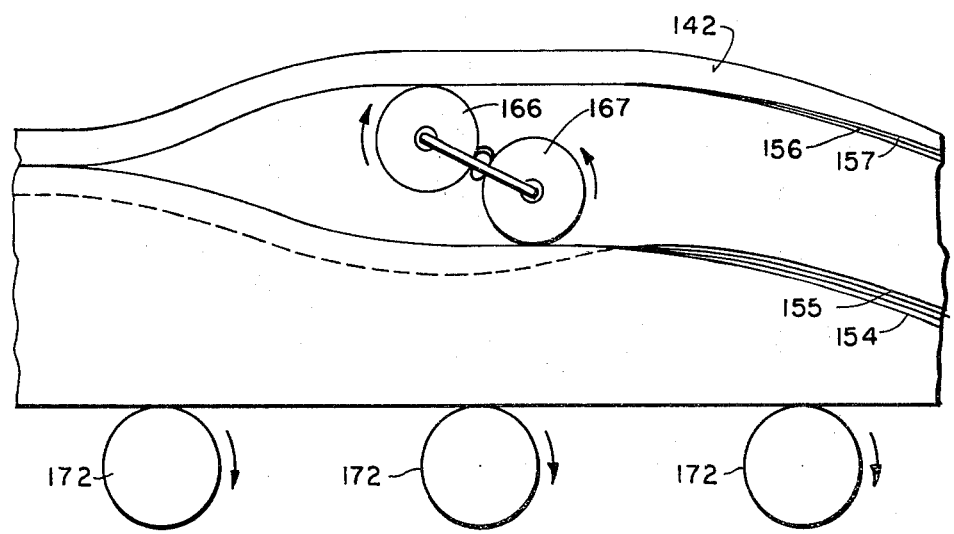
Fig. 21
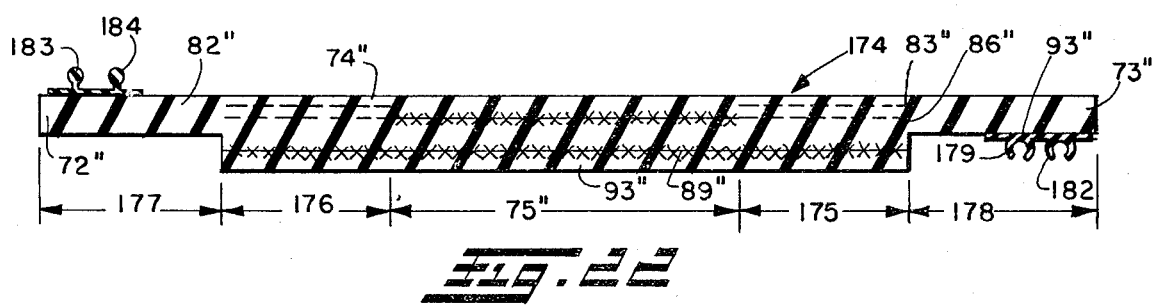
Fig. 22

STRETCHABLE LOAD-RETAINING CONVEYOR BELT

This application is a continuation-in-part of copending U.S. patent application Ser. No. 181,404 filed Aug. 26, 1980 now abandoned and relates to conveyor belts and especially to belts having load-retaining walls at the edges.

In most belt conveyors the belt is manufactured in a flat configuration but is troughed for retaining the conveyed material by rollers set at an angle and engaging the edge portions. Belts have also been molded in a U-shape such as the belt of my U.S. Pat. No. 4,061,223. In another case it was proposed to transversely prestretch the upper ply of a belt prior to curing so that after curing it would contract and cause the belt edges to curve upwardly. It has also been proposed to make the plies at the edges of the belt of materials having different coefficients of expansion so that during operation in a low temperature environment the edge portions will be curled upward and retain a fluid material. Other belts have been proposed having hinged edge portions which are supported by special brackets between a supporting power belt and the load-carrying container belt.

In some cases it is desirable to enclose the space over the load-carrying surface and belts have been made with retaining walls which have connecting edges. These belts have usually required elaborate mechanical equipment for connecting and disconnecting the edges.

The present invention is directed to a conveyor belt which is stretchable a predetermined amount upon installation. The belt edge portions curl up during the stretching and provide load-retaining walls. These walls may curl a greater or lesser amount depending on the belt construction and, where desired, may curl enough to connect the edges and enclose the material being conveyed. The belt edge portions curl up upon longitudinal stretching of the belt due to the interaction of belt narrowing means responsive to stretching of the belt and means resisting narrowing of the belt. The belt narrowing means are closer to the load-carrying surface than the resisting means whereby tension on the belt generates transverse force bending the edge portions of the belt to form retaining walls for the load carried by the belt.

The belt narrowing means can be one or more layers of bias cords which pantograph upon elongation of the belt.

The means resisting narrowing can be a layer of transversely extending cords or the elastomeric material of the belt.

It is usually desirable to have a belt cover at the load-carrying surface to protect the belt narrowing cords but the means resisting narrowing under the narrowing means must be sufficient to overcome the resistance of the elastomeric material of the cover and provide a sufficient net resistance in the desired direction to produce the curvature needed.

Since the edges of the belt in the present invention are under sufficient tension to hold the load without distortion, simple flat rollers may be used to support the load-carrying belt run.

Another advantage is derived from the minimum tension required to stretch the belt a predetermined amount upon installation. This minimum tension is more or less maintained throughout the belt length providing a built-in take-up action distributed along the entire belt conveyor rather than concentrating this action at a single point on the conveyor which may be a considerable distance from where the take-up action is needed.

The novel construction thus provides a more uniform distribution of stresses and makes possible a conveyor which may have rollers spaced apart a greater distance than rollers for a conventional conveyor.

In the drawings

FIG. 1 is a schematic side elevation of a stretchable belt embodying the invention mounted on a conveyor in the stretched condition, parts being broken away, and the unloading and loading conveyors being shown in chain-dotted lines.

FIG. 2 is a schematic plan view of the belt and conveyor shown in FIG. 1.

FIG. 3 is a fragmentary enlarged sectional view taken along the line 3—3 in FIG. 1.

FIG. 4 is an enlarged cross-sectional view of the belt of FIGS. 1-3 in the unstretched condition showing the position of the reinforcing cords.

FIG. 5 is a cross-sectional view of the stretchable belt of FIG. 4 showing the belt in the stretched condition.

FIG. 6 is a fragmentary cutaway plan view of the belt of FIG. 4 showing the position of the reinforcing cords and plies.

FIG. 7 is a cross-sectional view of a modification of the belt construction embodying the invention.

FIG. 8 is a fragmentary cutaway view of the belt of FIG. 7.

FIG. 9 is a cross-sectional view of another modification of the invention.

FIG. 10 is a fragmentary cutaway view of the belt of FIG. 9.

FIG. 11 is a cross-sectional view of a belt construction similar to the belt of FIGS. 9 and 10.

FIG. 12 is a cross-sectional view of a modification shown in the unstretched condition in which the belt is adapted to be trained around curves.

FIG. 13 is a fragmentary cutaway plan view of the belt of FIG. 12 in the unstretched condition.

FIG. 14 is a partially schematic cross-sectional view of the belt of FIGS. 12 and 13 showing the belt in the stretched condition.

FIG. 15 is a cross-sectional view of a belt similar to the belt of FIGS. 12, 13 and 14.

FIG. 16 is a fragmentary cutaway plan view of the belt of FIG. 15.

FIG. 17 is a schematic plan view of a conveyor including a further belt modification having edges which are connected for enclosing the material conveyed.

FIG. 18 is a fragmentary cross-sectional view of the belt of FIG. 17 taken along the line 18—18 in FIG. 17.

FIG. 19 is a cross-sectional view of the belt of FIG. 17 shown in the unstretched condition.

FIG. 20 is an enlarged fragmentary sectional view taken along the line 20—20 in FIG. 1.

FIG. 21 is an enlarged fragmentary sectional view taken along the line 21—21 in FIG. 1.

FIG. 22 is a sectional view of another belt similar to the belt of FIGS. 17-20.

Referring to FIGS. 1 and 2, a conveyor 10 is shown located in a horizontal position for conveying bulk materials such as coal from a loading belt 11 at one end to an unloading belt 12 at the other end. The conveyor 10 has a stretchable conveyor belt 13 extending over terminal pulleys such as tail pulley 14 and discharge pulley 15 located at the ends of the conveyor. A suitable belt drive 16 includes an electric motor 17 or other suitable power means connected to the discharge pulley 15 by a flexible chain or belt drive assembly 18.

With reference to FIGS. 1 and 3, a load-carrying upper run 19 of the conveyor belt 13 is supported by support rollers 22 mounted on roller frames 23 spaced longitudinally along the conveyor 10. A lower run 24 of the conveyor belt 13 is supported on split rollers 25 rotatably mounted on center supports 26 which are fastened to the roller frames 23.

As shown in FIGS. 4 and 6, the conveyor belt 13 includes an elongated elastomeric body of rubber or other rubberlike material with spaced-apart edges 27 and 28. A load-carrying belt surface 31 extends between the edges 27 and 28 and is located at the top side of the belt when in the load-carrying upper run 19 of the conveyor 10.

The conveyor belt 13 is stretchable at least 3 percent when subjected to longitudinal forces in tension and is mounted in tension on the conveyor 10. In this embodiment the conveyor belt 13 is spliced at a length such that the belt is elongated at least 3 percent when in the mounted position on the conveyor 10.

Belt narrowing means responsive to stretching of the belt 13 such as first and second layers 32 and 33 of bias cord reinforcing material generate predetermined transverse forces in a direction to reduce the width of the belt upon stretching during the initial installation on the conveyor 10. Since the transverse forces generated by the layers 32 and 33 are closest to the upper belt surface 31 and are resisted by the stiffness of the underlying material, the edges 27 and 28 and edge portions 29 and 30 of the belt 13 are caused to curl or bend upwardly, as shown in FIG. 5, and thereby provide retaining walls 34 and 35 at the edges for retaining material on the belt surface.

In other words, the first and second layers 32 and 33 are positioned closer to the belt surface 31 carrying the load than they are to the surface on the other side of the belt and this is believed to contribute further to bending of the edge portions 29 and 30 upwardly along the belt surface 31. Also, as shown in FIG. 4, the first and second layers 32 and 33 separate the resilient material of the conveyor body into an upper portion 36 between said layers and the belt surface 31 and a lower portion 37 on the other side of the first and second layers. Accordingly when the belt 13 is stretched the reduction in width of the belt surface 31 between the edges 27 and 28 is greater than the reduction in width of the belt at the lower portion 37 which further contributes to the curling or bending of the edges upwardly and away from the belt surface 31.

The belt 13, shown in detail in FIGS. 4, 5 and 6, has a top cover 38 which may be of the same resilient material as the rest of the belt, or may be of a more wear-resistant material, because the belt surface 31 over this cover is exposed to abrasion from the material to be conveyed. The elastic material of the belt 13 is highly stretchable and has a hardness on the durometer scale from about 60 to 80. For installations in coal mines the material may be a flame-resistant elastomer. For above-ground operation, the material of the belt 13 may be any conventional wear-resistant rubber such as those known as GRS and SBR rubbers. The first and second layers 32 and 33 have reinforcing cords 39 and 40 laid on a bias of about 55 degrees and may be at angles in the range of from about 40 degrees to about 60 degrees relative to a transverse axis A—A of the belt shown in FIG. 6. The first layer 32 extends from edge 27 to edge 28 and the second layer 33 is coextensive with and positioned under the first layer, but with the cords 40 laid at an opposite bias angle to the cords 39 of the first layer.

A third layer 43 of reinforcing cords is coextensive with and positioned under the second layer 33 and is formed of parallel cords 44 extending substantially transversely of the belt 13. A fourth layer 45 of reinforcing cords 46 is positioned under the third layer 43 with layer edges 47 and 48 spaced from the edges 27 and 28 of the belt 13. The cords 46 of the fourth layer 45 are laid on a bias at substantially the same angle as the cords 39 of the first layer 32. A fifth layer 49 of reinforcing cords 50 is coextensive with and positioned under the fourth layer 45 and has the cords laid on a bias at substantially the same angle as the cords 40 of the second layer 33.

The presence of the narrow band consisting of layers 45 and 49 of reinforcing material on the other side of the midplane balances the forces so that the reduction in width when the belt is stretched does not curl the center of the belt.

In the belt 13 of this embodiment, the cords 39, 40, 44, 46 and 50 of the first through fifth layers 32, 33, 43, 45 and 49 are of polyester and are spaced at about 22 ends per inch with each layer having a total thickness of about 0.05 inches. Separating or cushioning components 51 of elastomeric material are provided between the layers 32, 33, 43, 45 and 49 so that there can be relative angular movement of the cords 39 and 40, 40 and 44, 44 and 46, and 46 and 50. The relative movement of the cords contributes to the stretching of the belt 13 in the longitudinal direction and can be increased or decreased by changing the thickness of the cushioning components 51. In building the belt 13, the cords 39, 40, 44, 46 and 50 may be covered by a skim coat of elastomeric rubber and after vulcanization the skim coats of overlapping layers form the cushioning components 51.

In the belt 13, shown in FIGS. 4, 5 and 6, the cords 39, 40, 44, 46 and 50 have a thickness of about 0.03 inches and a skim coat of from about 0.01 to 0.02 inches is calendered or otherwise applied to each side of the cords resulting in each of the cushioning components 51 having a thickness of from about 0.02 to 0.04 inches. When the belt 13 is vulcanized the thickness of the cushioning components 51 will be reduced because of the removal of air and compacting of the elastomeric material. The top cover 38 has a thickness of about 0.06 inches and a bottom layer or bottom cover 53 of the belt 13 has a thickness of about 0.06 inches at the center portion. The total thickness of the belt 13 in the vulcanized condition is about 0.37 inches. The belt 13 of this embodiment has a total width of about 38 inches. The width of the fourth and fifth layers is about 20 inches and the width of each of the edge portions 29 and 30 of the belt is about 9 inches. The thickness of the bottom cover 53 is greater by 0.1 inches or 0.16 inches at the edge portions 29 and 30. This compares with the thickness of the top cover 38 of only 0.06 inches. It is therefore believed that the greater thickness of the bottom cover 53 adjacent the edges 27 and 28 of the belt 13 as compared with the thickness of the top cover 38 contributes to the curling or bending of the edge portions 29 and 30 away from the bottom cover and towards the top cover. In fact it has been found that the greater the difference in thickness between the top cover 38 and the bottom cover 53 the greater is the tendency of the edge portions 29 and 30 to curl.

The belt 13 is built and vulcanized in a flat condition, as shown in FIGS. 4 and 6, and then installed in a stretched condition as shown in FIGS. 1, 2, 3 and 5. The initial stretching of the belt 13 of at least 3 percent and preferably in the range of from 3 to 15 percent causes the cords 39 and 40 of the first and second layers 32 and 33 and the cords 46 and 50 of the fourth and fifth layers 45 and 49 to pantograph and progressively resist further elongation as the belt is stretched. It has been found that with the cord angles of around 55 degrees relative to the transverse axis A—A the belt 13 may be stretched between 3 and 15 percent after which the resistance to stretching is substantial and sufficient for load-carrying operation of the conveyor 10. It has also been found that the pantographing of the cords 39 and 40 in the first and second layers 32 and 33 generates a substantial transverse force which interacts with the resistance of the resilient material of the belt 13 and bends the edge portions 29 and 30 upwardly to function as retaining walls 34 and 35 as shown in FIG. 5. The cords 46 and 50 of the fourth and fifth layers 45 and 49 neutralize the action of the cords 39 and 40 of the first and second layers 32 and 33 at the center portion of the belt 13, thus maintaining a relatively flat surface 31 between the curled side edge portions 29 and 30. The transverse cords 44 of the third layer 43 further resist a reduction in width or narrowing of the belt 13 and accordingly contribute to the curling or bending of the edge portions 29 and 30. Nevertheless, when the belt 13 passes over the tail pulley 14 and discharge pulley 15 it will flatten out as shown in FIGS. 1 and 2.

In the return lower run 24 the belt 13 is in the stretched condition and retaining walls 34 and 35 extend downwardly at each side of the split rollers 25. As shown in FIG. 3, if the belt 13 in the lower run 24 travels to either side, it will be prevented from running off the split rollers 25 by engagement of the retaining walls 34 and 35 with the ends of the split rollers.

As described hereinabove, when the belt 13 is subjected to a sufficient tension, the walls 34 and 35 will be retained in the operating condition for containing the bulk material so that the rollers 22 may be cylindrical. The substantial tension maintained throughout the length of the belt 13 also makes possible a greater spacing between the support rollers 22 than is possible with a conventional conveyor belt.

Referring to FIGS. 7 and 8, a modified construction of a conveyor belt 54 is shown having an elongated elastomeric body of resilient material with spaced edges 55 and 56. A first layer 57 has reinforcing cords 58 laid on a bias of about 45 degrees to transverse axis B—B of the belt and extends between the edges 55 and 56 of the belt 54. The belt 54 has a load-carrying belt surface 59 on a top cover 62 under which the first layer 57 is located. A second layer 63 of reinforcing cords 64 is positioned under said first layer 57 with the cords laid at an opposite bias angle of 45 degrees to the angle of the cords 58 of the first layer. The second layer 63 has edges 65 and 66 which are spaced from the edges 55 and 56 of the belt 54 providing a center portion between the edges 65 and 66. Edge portions 67 and 68 are also provided between the edges 55 and 65 and the edges 56 and 66.

A bottom cover 69 is positioned under the second layer 63 and has a thickness of about 0.07 inches at the center portion. The top cover 62 also has a thickness of about 0.07 inches and the first layer 57 and second layer 63 each have a thickness of about 0.05 inches. A cushioning component 70 is located between the cords 58 and 64 of the first and second layers 57 and 63 and may have a thickness of about 0.01 to 0.02 inches prior to vulcanization of the belt 54. As shown in FIGS. 7 and 8, the thickness of the bottom cover 69 at the edge portions 67 and 68 is greater than the thickness at the center portion which further contributes to the curling or bending upwards of the edge portions.

The cords 58 and 64 of the first and second layers 57 and 63 are of a suitable textile material such as polyester and may be spaced at about 22 ends per inch. The width of the belt is about 34 inches with the center portion having a width of 10 inches and the edge portions 67 and 68 each having a width of about 12 inches in the unstretched condition. The belt 54 is stretchable at least 3 percent and when stretched decreases in width a proportional amount. Also the edge portions 67 and 68 bend upwardly to provide retaining walls at the sides of the belt surface 59 in the stretched condition in a similar manner to that described hereinabove for the embodiment of FIGS. 4, 5 and 6. The cords 64 of the second layer 63 neutralize the curling action of the cords 58 of the first layer 57 and provide a relatively flat surface 59 between the curled side edges 55 and 56.

Another modification is shown in FIGS. 9 and 10 in which a belt 71 has an elongated elastomeric body with edges 72 and 73 and a belt surface 74 extending between the edges. The belt 71 has a center portion 75 with margins 76 and 77 spaced from the edges 72 and 73 providing edge portions 78 and 79. The belt surface 74 is on a top cover 82 which has a thickness of about 0.07 inches. The top cover 82 may be of a resilient material having good wear characteristics as indicated above. Under the top cover 82 is a first layer 83 of reinforcing cords 84 and 85 in the edge portions 78 and 79, respectively. The first layer 83 extends from the edges 72 and 73 of the belt 71 to the margins 76 and 77 of the central portion 75 in the edge portions 78 and 79. The cords 84 in the edge portion 78 are laid on a bias to the transverse axis C—C at an angle of 45 degrees in one direction. The cords 85 of the edge portion 79 are laid at an angle of 45 degrees to the transverse axis C—C and at an opposite bias angle to the cords 84 of the other edge portion 78. Under the first layer 83 is a second layer 86 of reinforcing cords 87 and 88 in edge portions 78 and 79 laid at an angle of 45 degrees to the transverse axis C—C but at an opposite bias angle direction to the cords 84 and 85 of the first layer.

Under the second layer 86 is a third layer 89 of square woven stretch fabric 90. This type of reinforcement for a conveyor belt is described in my patent application Ser. No. 399,767 which is a continuation-in-part of application Ser. No. 181,402, now abandoned, filed concurrently with application Ser. No. 181,404 for which this application is a continuation-in-part now abandoned. The third layer 89 extends from one edge 72 of the belt 71 to the other edge 73. The stretch fabric 90 of the third layer 89 has the property of stretching a predetermined distance when subject to tension during the initial stretching of the belt 71 and then its resistance to further elongation increases rapidly to resist any appreciable stretching of the belt in operation.

In this modification, the top cover 82 has thickness of about 0.07 inches. The first layer 83 is of polyester cords spaced at about 22 ends per inch with the first layer having a thickness of about 0.05 inches. The second layer 86 also has a thickness of about 0.05 inches and polyester cords spaced at about 22 ends per inch. A bottom cover 93 under the third layer 89 has a thickness of about 0.07 inches. Cushioning components 92 are located between the cords 84 and 85 of the first and second layers 83 and 86 and between the cords 87 of the second layer 86 and the stretch fabric 90 of the third layer 89. The cushioning components 92 may have a thickness of about 0.01 to 0.02 inches prior to vulcanization.

In operation the belt 71 is built and vulcanized in the flat condition as shown in FIGS. 9 and 10 with the stretch fabric 90 of the third layer 89 in the unstretched condition. Upon installation of the belt 71 on a conveyor, the belt is initially stretched a predetermined amount of at least 3 percent, at which point further stretching of the belt is strongly resisted. During the stretching process, the cords 84, 85, 87 and 88 of the first and second layers 83 and 86 pantograph and bend the edge portions 78 and 79 upwardly at the sides of the belt surface 74 providing retaining walls such as those shown in FIGS. 3 and 5. With the stretch fabric 90 of the third layer 89 the longitudinal force necessary for initial stretching of the belt 71 is less than it would be if the stretching of the belt was limited by layers of reinforcing cord laid on a bias such as that shown in the modifications of FIGS. 4 through 8. Also transverse cords of the stretch fabric 90 resist reduction in width of the belt 71 and contribute to the bending of the edge portions 78 and 79.

Referring to FIG. 11, a belt 71' is shown which is identical to the belt of FIGS. 9 and 10 except that in the second layer 86' a center portion 94 has been added to fill the space between the margins 76' and 77'. The center portion 94 of the second layer 86' is of square woven stretch fabric 95 having the property of being stretchable upon initial stretching of the belt 71' during installation on the conveyor and then having a high resistance to further stretching of the belt in operation. The stretch fabric 95 of the center portion 94 of the second layer 86' may have the same characteristics as the stretch fabric 90 of the third layer 89 of the belt 71 shown in FIGS. 9 and 10. The cushioning component 92' between the cords of the second layer 86' and the stretch fabric of the third layer 89' also extends between the stretch fabric of the second and third layers. In operation, the belt of FIG. 11 is stretchable and will provide upstanding retaining walls in a similar manner to the belt of FIGS. 9 and 10; however, the belt of FIG. 11 may have greater strength in the longitudinal direction in the stretched condition.

A belt 96 adaptable for movement around curves is shown in FIGS. 12, 13 and 14. The belt 96 has an elongated elastomeric body with a top portion 97 and a bottom portion 98 connected at a center portion 99. As shown in FIGS. 12 and 13, the top portion 97 has a top cover 102 extending between edges 103 and 104 which may be of a resilient material having good wear characteristics. Under the top cover 102 is a first layer 105 of reinforcing cords 106 in edge portions 108 and 109 extending inward from edges 103 and 104 to the center portion 99. The cords 106 in the edge portions 108 and 109 are laid at a bias angle of about 45 degrees to the transverse axis D—D.

Under the first layer 105 is a second layer 112 of reinforcing cords 113 coextensive with the cords 106 of the first layer 105. The reinforcing cords 113 are laid at an angle of about 45 degrees to the transverse axis D—D and at an opposite bias angle to the cords 106 of the first layer 105.

Under the second layer 112 is a third layer 115 of transversely extending cords 116 between the edges 103 and 104 of the belt 96. Under the third layer 115 is a middle cover 118 which is connected at the center portion 99 to a middle cover 119 of the bottom portion 98. As shown in FIGS. 12, 13 and 14, the bottom portion 98 in the unstretched condition preferably has a width less than the width of the top portion 97.

Under the middle cover 119 is a fourth layer 122 of reinforcing cords 123 extending transversely between the edges 103 and 104 of the bottom portion 98 of the belt 96. Preferably the reinforcing cords 123 are of a high modulus material such as steel.

Under the fourth layer 122 is a fifth layer 124 of reinforcing cords 125 positioned at a bias angle substantially the same as the bias angle of the cords 106 of the first layer 105 and extending from edge-to-edge of the center portion 99. Under the fifth layer 124 and coextensive therewith is a sixth layer 126 of reinforcing cords 127 laid on a bias at an angle similar to the angle of cords 113 of the second layer 112.

Under the sixth layer 126 is a seventh layer 128 of reinforcing cords 129 extending transversely between the edges 103 and 104. The cords 129 are preferably of high modulus material such as steel. Under the seventh layer 128 is a bottom cover 130 which extends from edge 103 to edge 104 of the bottom portion 98. The transverse cords 129 of the seventh layer 128 and cords 123 of the fourth layer 122 are spaced longitudinally of the belt 96 sufficiently to permit longitudinal stretching of the belt 96 by an initial amount of at least 3 percent. During this stretching the cords 106 and 113 of the first and second layers 105 and 112 interact with the transverse cords 116 of the third layer 115 and with the elastomeric material of the belt 96 causing the upper surface of the edge portions 108 and 109 to contract laterally and bend upwardly forming retaining walls 131 and 132 for containing material being conveyed on a load-carrying belt surface 133. Cushioning components 139 are located between the cords of the first and second layers 105 and 112, the second and third layers 112 and 115, the fourth and fifth layers 112 and 124, the fifth and sixth layers 124 and 126, and the sixth and seventh layers 126 and 128.

The belt 96 is fabricated and molded in the flat condition shown in FIGS. 12 and 13 with the edge portions 108 and 109 of the top portion 97 and bottom portion 98 separated by a sheet or plate of material to form slots 134 and 135 extending to the center portion 99. In operation the belt 96 is stretchable an initial amount of from 3 to 15 percent due to the pantographing of the reinforcing cords 106 of the first layer 105, reinforcing cords 113 of the second layer 112, cords 125 of the fifth layer 124, and cords 127 of the sixth layer 126. The interaction of the cords 106 of the first layer 105 and the cords 113 of the second layer 112 with the elastomeric material of the belt 96 and the transverse cords 116 of the third layer 115 during the stretching of the belt causes the edge portions 108 and 109 to bend upwardly and form the walls 131 and 132.

In this embodiment the top cover 102 has a thickness of about 0.07 inches at the edge portions 108 and 109 and about 0.13 inches at the center portion 99. The reinforcing cords 106 of the first layer 105 and cords 113 of the second layer 112 may be of polyester and be spaced at about 22 ends per inch. The thickness of the first and second layers 105 and 112 may be about 0.05 inches each. The third layer 115 may also have reinforcing polyester cords 116 spaced at about 22 ends per inch and have a thickness of about 0.05 inches. The middle cover 118 for the top portion 97 may have a thickness of about 0.07 inches.

The middle cover 119 of the bottom portion 98 may also have a thickness of about 0.07 inches. The transverse reinforcing cords 123 and 129 of the fourth and seventh layers 122 and 128 may be steel strands spaced at eight ends per inch and having a thickness of about 0.1 inches. The fifth and sixth layers 124 and 126 may have reinforcing polyester cords 125 and 127 spaced at about 22 ends per inch with a thickness of about 0.05 inches for each layer. The bottom cover 130 may have a thickness of 0.07 inches. The cushioning components 139 may have a thickness depending on the thickness of the skim coat on the cords. The cords of polyester have a skim coat of a thickness of from about 0.01 to 0.02 inches and the cords of steel have a skim coat of from about 0.01 to 0.03 inches. Therefore the total thickness of the cushioning components 139 may be from about 0.02 to 0.05 inches.

In operation when the belt 96 is directed around a curve the bottom portion 98 resists transverse deflection of the belt and supports the top portion 97 which has the walls 131 and 132 for retaining the material on the belt surface 133. Due to the stretching of the walls 131 and 132 they will be maintained in position even though the elongation of the belt 96 varies across the width of the belt. Normally pulleys (not shown) are positioned around the edges 103 and 104 of the bottom portion 98 and also under the bottom cover 130 to maintain the configuration of the belt 96 around curves.

A belt 136 is shown in FIGS. 15 and 16 which is similar to the belt 96 shown in FIGS. 12, 13 and 14. However, instead of the fifth and sixth layers 124 and 126 of reinforcing cords 123 and 125 being positioned at a bias angle to the transverse axis D—D, a separating layer 137 of square woven stretch fabric 138 extending between the edges of the center portion 99' is positioned between the fourth and seventh layers 122' and 128'. The stretch fabric 138 of the separating layer 137 has the property of stretching a predetermined distance upon initial stretching during installation of the belt 136 from about 3 to 15 percent and then has a high resistance to further stretching of the belt in operation. In other respects the construction of belt 136 to FIGS. 15 and 16 is the same as the construction of the belt 96 except there is one less cushioning component 139'. In operation the transverse cords of the stretch fabric 138 and the elastomeric material of the belt 136 interact with the reinforcing cords 106' of the first layer 105' and the cords 113' of the second layer 112' to bend the edge portions 108' and 109' of the top portion 97' upwardly into the shape shown in FIG. 14.

Referring to FIGS. 17, 18, 19, 20 and 21 a further modification is shown in which a belt 142 having a construction shown in greater detail in FIG. 19 has edge portions 143 and 144 and a center portion 145. The edge portions 143 and 144 are located between the center portion 145 and edges 146 and 147 of the belt 142. The edge portions 143 and 144 may be divided into outer margins 148 and 149 adjacent the edges 146 and 147 and inner margins 152 and 153 adjacent the center portion 145. The belt 142 may be of an elastomeric material and have a construction similar to the construction described hereinabove for the belt 13 shown in FIGS. 4 and 5 except that the belt 142 shown in FIG. 19 has edge portions 143 and 144 of greater width than the edge portions of the belt 13 by the width of the outer margins 148 and 149. Also the third layer 43' extends beyond the ends of the first and second layers 32' and 33' so that when the belt 142 is in the stretched condition as shown in FIG. 18 the edge portions 143 and 144 will overlap to enclose the space above the load-carrying belt surface 31'. With the construction of the belt 142 the thickness of the belt at the outer margins 148 and 149 is reduced which also reduces the weight at the edges 146 and 147.

As shown in FIGS. 19 and 20 connecting means such as channels 154 and 155 are mounted on the bottom cover 53' at the outer margin 149 and ribs 156 and 157 are mounted on the surface 31' of the top cover 38' at the other outer margin 148 for matching engagement upon pressing of the margin 148 against the margin 149 by suitable means such as rollers 158 and 159. As shown in FIG. 17 the rollers 158 and 159 may be mounted on a frame 162 at one end of a conveyor 163 close to the tail pulley 164. After the load is applied to the belt surface 31' and the belt 142 takes the configuration shown in FIG. 18 the ribs 156 and 157 may be pushed into engagement with the channels 154 and 155 providing a sealed chamber within the belt for conveying material. At the discharge end of the conveyor 163, discharge pulley 165 tends to spread the walls 34' and 35' and as shown in FIG. 21 separating rollers 166 and 167 may be used to assist in this action and pull the ribs 156 and 157 out of the channels 154 and 155 so that the material conveyed on the surface 31 may be discharged and the return run 168 carried back to the tail pulley 164 by suitable rollers 169 as shown in FIG. 18. The upper run 170 may be supported by support rollers 172. As shown in FIG. 18 a roller frame 173 mounted on a supporting surface such as the ground or hung from the roof supports the rollers 169 and 172.

In operation the belt 142 is mounted on the conveyor 163 under tension in a similar manner to that described hereinabove for the other modifications. As the belt 142 is driven from the tail pulley 164 to the discharge pulley 165 the rollers 158 and 159 will urge the ribs 156 and 157 into engagement with the channels 155 and 154. Then at the discharge end the discharge pulley 165 spreading the walls 34' and 35' and supplemented by the separating rollers 166 and 167 will pull the ribs 156 and 157 out of the channels 154 and 155 and permit the discharge of the material at the discharge pulley 165. The elastomeric material of the belt 142 and the reinforcing cords may be the same as that described hereinabove for the belt 13 of FIGS. 4, 5 and 6. The channels 154 and 155 and ribs 156 and 157 may be of a resilient material such as nylon which is adhered to the belt 142 by a suitable adhesive.

Referring to FIG. 22 a belt 174 has a construction similar to the construction of the belt 71' shown in FIG. 11 except that the first layer 83" and second layer 86" extend over only inner margins 175 and 176 adjacent the central portion 75". Outer margins 177 and 178 extend beyond the ends of the first and second layers 83" and 86" and are adjacent the edges 72" and 73" of the belt 174. Also connecting means such as channels 179 and 182 are mounted on the bottom cover 93" at the outer margin 178 and ribs 183 and 184 are mounted on the surface 74" of the top cover 82" at the outer margin 177 for matching engagement upon pressing of the margin 177 against the margin 178 by suitable means such as the rollers 158 and 159 shown in FIG. 20.

In operation the belt 174 is mounted on a coveyor similar to the conveyor 163 shown in FIG. 17 and operated under tension in the same manner as that described for the belt 142 shown in FIGS. 17, 18, 19 and 20.

In FIGS. 19 and 21 the belts 142 and 174 have outer margins 148, 149, 177 and 178 which are shown substantially equal in width to the corresponding inner margins 152, 153, 176 and 175. It is evident that the outer margins may have a width substantially greater than the width of the inner margins and be in relation to the width of the center portions 145 and 75" so that the edges will overlap to enclose the load carried by the belts.

While certain representative embodiments and details have been shown for the purpose of illustrating the invention it will be apparent to those skilled in the art that various changes and modifications may be made therein without departing from the invention.

I claim:

1. A stretchable conveyor belt comprising an elongated elastomeric body having spaced-apart edges, edge portions along the said edges, a load-carrying belt surface on one side of said body extending between said edges, said belt being stretchable at least 3 percent when subjected to longitudinal forces in tension, belt narrowing means responsive to stretching of said belt whereby tension on said belt generates transverse forces in a direction to reduce the width of the belt, said belt narrowing means including a first layer of reinforcing cords extending from one of said edges to the other of said edges laid on a bias to the transverse axis of the belt and a second layer of reinforcing cords coextensive with and positioned under said first layer laid at an opposite bias angle to the cords of said first layer, resistance means including a third layer of reinforcing cords coextensive with and positioned under said second layer formed of parallel cords extending substantially transversely of the belt, to selectively resist said transverse forces generated by said narrowing means and bend said edge portions of said belt by interaction with said narrowing means providing retaining walls at said edges for the load carried by said belt surface, and balancing means including a fourth layer of reinforcing cords under said third layer of cords having layer edges spaced from said edges of said belt and positioned under said third layer laid on a bias at substantially the same angle as the cords of said first layer, and a fifth layer of reinforcing cords coextensive with and positioned under said fourth layer laid on a bias at substantially the same angle as the cords of said second layer.

2. A belt in accordance with claim 1 wherein the cords of said first, second, fourth and fifth layers are laid on a bias of about 55 degrees to a transverse axis of the belt.

3. A belt in accordance with claim 2 wherein the cords of said first through fifth layers are of polyester spaced at about 22 ends per inch with a thickness of about 0.05 inches for each layer.

4. A belt in accordance with claim 3 wherein said elastomeric body has a top layer of wear-resistant material between said first layer and said belt surface on one side of said body, and said resistance means including a bottom layer of resilient material under said fifth layer, said top layer having a thickness of about 0.06 inches and said bottom layer having a thickness of about 0.06 inches and the total thickness of said belt in the vulcanized condition being about 0.37 inches.

5. A stretchable conveyor belt comprising an elongated elastomeric body having spaced-apart edges, edge portions along said edges, a load-carrying belt surface on one side of said body extending between said edges, said belt being stretchable at least 3 percent when subjected to longitudinal forces in tension, belt narrowing means responsive to stretching of said belt whereby tension on said belt generates transverse forces in a direction to reduce the width of the belt, said belt narrowing means including a first layer of reinforcing cords laid on a bias to the transverse axis of the belt and extending only part way across the belt, said first layer being positioned under said belt surface and extending from the edges towards the middle of the belt but being separated by a center portion of the belt, said reinforcing cords of said first layer being laid on a bias at an angle to a transverse axis at a first edge portion of the belt adjacent one of the edges, said first layer having cords at a second edge portion of the belt adjacent the other of said edges laid at an opposite bias angle to the cords at said first edge portion, said narrowing means also including a second layer coextensive with and positioned under said first layer having reinforcing cords laid at an opposite bias angle to the cords of said first layer, balancing means including a third layer of stretch fabric under said second layer and extending from one of said edges to the other of said edges, said stretch fabric of said third layer having the property of stretching a predetermined distance when subject to tension during installation of the belt and then having a rapidly increasing resistance to further elongation of the belt in operation, and resistance means positioned in said belt to selectively resist said transverse forces generated by said narrowing means and bend said edge portions of said belt by interaction with said narrowing means providing retaining walls at said edges for the load carried by said belt surface.

6. A belt in accordance with claim 5 wherein the cords of said first and second layers are laid on a bias of about 45 degrees to the transverse axis of the belt.

7. A belt in accordance with claim 6 wherein the cords of said first and second layers are of polyester and are spaced at about 22 ends per inch with a thickness of about 0.05 inches for each layer.

8. A belt in accordance with claim 7 wherein said elastomeric body has a top layer of wear-resistant material between said first layer and said belt surface on one side of said body, a bottom layer of resilient material under said third layer, said top layer having a thickness of about 0.07 inches and said bottom layer having a thickness of about 0.07 inches.

9. A belt in accordance with claim 5 wherein said second layer has a center portion of stretch fabric having the property of being stretchable upon initial stretching of the belt when subject to tension during installation on the conveyor and then having a rapidly increasing resistance to further elongation of the belt in operation.

10. A belt in accordance with claim 9 wherein said stretch fabric of the center portion of said second layer is of the same material as the stretch fabric of said third layer.

11. A stretchable conveyor belt comprising an elongated elastomeric body having spaced-apart edges, edge portions along said edges, a load-carrying belt surface on one side of said body extending between said edges, said belt being stretchable at least 3 percent when subjected to longitudinal forces in tension, belt narrowing means responsive to stretching of said belt whereby tension on said belt generates transverse forces in a direction to reduce the width of the belt, and resistance means positioned in said belt to selectively resist said transverse forces generated by said narrowing means and bend said edge portions of said belt by interaction with said narrowing means providing retaining walls at said edges for the load carried by said belt surface, said elastomeric body having a top portion containing said narrowing means responsive to stretching of said belt, said top portion at said edges being bendable to form said retaining walls upon stretching of said belt, a bottom portion reinforced by transversely extending reinforcing means to resist transverse deflection of said belt when passing around a curve, said bottom portion being connected to said top portion at a center portion of said belt spaced from said edges to permit bending of said top portion at said edges upon stretching of said belt, said narrowing means of said top portion including a first layer of reinforcing cords positioned under said belt surface and extending from the edges towards the middle of the belt but being separated by a center portion of the belt, said reinforcing cords of said first layer being laid on a bias at an angle to a transverse axis of said belt, said narrowing means including a second layer coextensive with and positioned under said first layer having reinforcing cords laid at an opposite bias angle to the cords of said first layer, said resistance means including a third layer of reinforcing cords under said second layer and extending from one of said edges to the other of said edges, said cords of said third layer being substantially transverse of the belt, and said bottom portion including a fourth layer positioned under said third layer and in said bottom portion of said belt, said cords of said fourth layer extending transversely of the belt and being of a material having a high modulus of elasticity, a fifth layer of reinforcing cords under said fourth layer, said cords of said fifth layer being laid on a bias at an angle to the transverse axis of the belt, a sixth layer under said fifth layer, said sixth layer being coextensive with said fifth layer, said cords of said sixth layer being laid at an opposite bias angle to the cords of said fifth layer, a seventh layer under said sixth layer, said cords of said seventh layer being of a material having a high modulus of elasticity and extending transversely of said belt whereby said belt is stretchable an initial amount due to the pantographing of the reinforcing cords of said fifth and sixth layers and said first and second edge portions are bendable upwardly to provide retaining walls due to the interaction of said first and second layers with the resilient material of said elongated elastomeric body.

12. A belt in accordance with claim 11 wherein said first, second, third, fifth and sixth layers have reinforcing plies of polyester cords spaced at about 22 ends per inch and a thickness of about 0.05 inches, said fourth and seventh layers have reinforcing cords of steel spaced at about 8 ends per inch with a thickness of about 0.1 inches and said reinforcing cords in layers one, two, five and six are laid at an angle of about 45 degrees to the transverse axis of said belt.

13. A stretchable conveyor belt comprising an elongated elastomeric body having spaced-apart edges, edge portions along said edges, a load-carrying belt surface on one side of said body extending between said edges, said belt being stretchable at least 3 percent when subjected to longitudinal forces in tension, belt narrowing means responsive to stretching of said belt whereby tension on said belt generates transverse forces in a direction to reduce the width of the belt, and resistance means positioned in said belt to selectively resist said transverse forces generated by said narrowing means and bend said edge portions of said belt by interaction with said narrowing means providing retaining walls at said edges for the load carried by said belt surface, said elastomeric body having a top portion containing said narrowing means responsive to stretching of said belt, and said top portion at said edges being bendable to form said retaining walls upon stretching of said belt, a bottom portion reinforced by transversely extending reinforcing means to resist transverse deflection of said belt when passing around a curve, said bottom portion being connected to said top portion at a center portion of said belt spaced from said edges to permit bending of said top portion at said edges upon stretching of said belt, said narrowing means of said top portion including a first layer of reinforcing cords positioned under said belt surface and extending from the edges towards the middle of the belt but being separated by a center portion of the belt, said reinforcing cords of said first layer being laid on a bias at an angle to the transverse axis of said belt, said narrowing means including a second layer coextensive with and positioned under said first layer and having reinforcing cords laid at an opposite bias angle to the cords of said first layer, said resistance means including a third layer of reinforcing cords under said second layer and extending from one of said edges to the other of said edges, said cords of said third layer being substantially transverse of the belt, a fourth layer positioned under said third layer and in said bottom portion of said belt, said cords of said fourth layer extending transversely of the belt and being of a material having a high modulus of elasticity, said bottom portion including a fifth layer of square woven stretch fabric located in said center portion under said fourth layer, said stretch fabric of said fifth layer having the property of stretching a predetermined distance when subject to tension during installation of the belt and then having a rapidly increasing resistance to further elongation of the belt in operation, a sixth layer under said fifth layer, said cords of said sixth layer extending transversely of said belt whereby said belt is stretchable an initial amount due to the stretching of the stretch fabric of said fifth layer and said first and second edge portions of said top portion being bendable upwardly to provide retaining walls due to the interaction of said first and second layers with the resilient material of said elongated elastomeric body and the transverse cords of said third layer.

14. A stretchable conveyor belt comprising an elongated elastomeric body having spaced-apart edges, edge portions along said edges, a load-carrying belt surface on one side of said body extending between said edges, said belt being stretchable at least 3 percent when subjected to longitudinal forces in tension, belt narrowing means responsive to stretching of said belt whereby tension on said belt generates transverse forces in a direction to reduce the width of the belt, resistance means positioned in said belt to selectively resist said transverse forces generated by said narrowing means and bend said edge portions of said belt by interaction with said narrowing means providing retaining walls at said edges for the load carried by said belt surface, and said edge portions being of sufficient width and said interaction of said narrowing means and said resistance means being sufficient to bend said edge portions of said belt until said retaining walls substantially enclose the space above said load-carrying belt surface when said belt is in the stretched condition.

15. A belt in accordance with claim 14 wherein each of said edges has a connecting means for engaging the other of said edges for enclosing the space above said belt surface during operation of the belt in the stretched condition.

16. A belt in accordance with claim 14 wherein said body has a center portion positioned between said edge portions, said narrowing means including a first layer of reinforcing cords positioned under said belt surface and extending from within one of said edge portions into the other of said edge portions, said reinforcing cords of said first layer being laid on a bias at an angle to a transverse axis of the belt, said narrowing means also including a second layer coextensive with and positioned under said first layer having reinforcing cords laid at an opposite bias angle to the cords of said first layer, said resistance means including a third layer of transverse reinforcing cords extending from one of said spaced-apart edges to the other of said edges, and balancing means including a fourth layer of reinforcing cords having substantially the same width as said center portion, said cords of said fourth layer being laid on a bias at an angle to said transverse axis, and said balancing means also including a fifth layer of reinforcing cords coextensive with and positioned under said fourth layer having reinforcing cords laid at an opposite bias angle to the cords of said fourth layer.

17. A belt in accordance with claim 16 wherein each of said edge portions has an inner margin adjacent said center portion and an outer margin adjacent one of said edges, said first and second layers extending through said inner margin but terminating short of said outer margin of each of said edge portions, said transverse reinforcing cords extending through both said inner and outer margins of each of said edge portions and a bottom cover positioned under said fifth layer and the ends of said third layer having a relatively constant thickness to reduce the thickness of said belt at said outer margin of each of said edge portions.

18. A belt in accordance with claim 16 wherein the angle of said reinforcing cords of said first, second, fourth and fifth layers relative to said transverse axis is about 55 degrees.

19. A belt in accordance with claim 14 wherein said body has a center portion positioned between said edge portions and each of said edge portions has an inner margin adjacent said center portion and an outer margin adjacent one of said edges, said narrowing means including a first layer of reinforcing cords positioned under said belt surface and in said inner margin of each of said edge portions, said reinforcing cords of said first layer at one of said margins being laid on a bias at an angle to a transverse axis of said belt, said reinforcing cords of said first layer in the other of said margins being laid at an opposite bias angle to the cords in said first-mentioned margin, said narrowing means also including a second layer of reinforcing cords coextensive with and positioned under said first layer, said reinforcing cords of said second layer in said inner margins being laid on a bias at an opposite bias angle to the cords of said first layer, said second layer including resistance means comprising square woven stretch fabric in said center portion having the property of stretching a predetermined distance under tension during installation of the belt and then rapidly increasing resistance to further elongation of the belt in operation, said resistance means including a third layer of stretch fabric under said second layer and extending through said center portion and said inner margin of each of said edge portions but terminating short of said outer margin.

20. A belt in accordance with claim 19 including a bottom cover positioned under said third layer and has a relatively constant thickness in said edge portions to reduce the thickness of the belt at said outer margins.

21. A belt in accordance with claims 16 or 20 wherein connecting means for each of said edges are mounted on said edge portions for engagement upon enclosing the space above said belt surface during operation of the belt in the stretched condition.

22. A load-carrying belt conveyor system comprising support rollers positioned at longitudinally spaced-apart locations on said system defining a belt path, said belt path having a predetermined length, a stretchable conveyor belt installed on said system along said belt path, said belt having a length in the molded condition less than said predetermined length of said belt path by a sufficient amount so that said belt is initially stretched at least 3 percent when in the mounted position in said system, said stretchable conveyor belt including an elongated elastomeric body having spaced-apart edges, edge portions along said edges, a load-carrying belt surface on one side of said body extending between said edges, belt narrowing means responsive to stretching of said belt whereby tension on said belt generates transverse forces in a direction to reduce the width of the belt, said belt narrowing means including a first layer of reinforcing cords laid on a bias to the transverse axis of the belt and extending from one of said edges to the other of said edges under said belt surface, a second layer of reinforcing cords coextensive with and positioned under said first layer laid at an opposite bias angle to the cords of said first layer, and resistance means in said belt coextensive with and positioned under said second layer to selectively resist said transverse forces generated by said narrowing means so that said edge portions of said belt are bent by interaction with said narrowing means providing retaining walls at said edges for the load carried by said belt surface, and balancing means including at least one layer of reinforcing cords having layer edges spaced from the edges of said belt to maintain a relatively flat surface between said retaining walls.

* * * * *